United States Patent [19]

Mock

[11] Patent Number: 5,757,527
[45] Date of Patent: May 26, 1998

[54] OPTICAL FIBER TRANSMISSION SYSTEM MAPPING ARRANGEMENT

[75] Inventor: Joel Leslie Mock, Norcross, Ga.

[73] Assignee: Lucent Technologies Inc., Murray Hill, N.J.

[21] Appl. No.: 657,256

[22] Filed: Jun. 3, 1996

[51] Int. Cl.$^6$ ................................................. H04J 14/00
[52] U.S. Cl. .......................................... 359/117; 359/110
[58] Field of Search ............................... 359/117, 110, 359/128, 139, 171; 455/226-2; 356/73.1

[56] References Cited

U.S. PATENT DOCUMENTS

| | | | |
|---|---|---|---|
| 4,720,827 | 1/1988 | Kanaji | 359/137 |
| 4,896,935 | 1/1990 | Lee | 350/96.2 |
| 4,946,236 | 8/1990 | Dautartas et al. | 350/96.2 |
| 5,267,068 | 11/1993 | Torihata | 359/110 |
| 5,329,392 | 7/1994 | Cohen | 359/124 |
| 5,596,440 | 1/1997 | Patz et al. | 359/110 |
| 5,596,730 | 1/1997 | Sekine | 359/117 |

*Primary Examiner*—Kinfe-Michael Negash

[57] ABSTRACT

A mapping system and method for mapping optical fiber communication networks which have several stages has switches at each stage which have an input, a home position stage, and a plurality of outputs. An optical signal is applied to the input of one of the switches and the energy appearing at its home port is measured and applied to a CPU. The switch is then stepped to apply the optical energy to the output ports, and the optical energy appearing at the home ports of the switches in the next stage affords an indication of which output port of the first stage switch is connected to the input of which switch in the second stage. The same procedure is performed for the switches in the third stage, until the network, or a portion thereof, is mapped.

12 Claims, 3 Drawing Sheets

OPTICAL FIBER TRANSMISSION SYSTEM MAPPING ARRANGEMENT

FIELD OF THE INVENTION

This invention relates to fiber optic communication methods and, more particularly, to a method and apparatus for mapping such a network.

BACKGROUND OF THE INVENTION

Optical fiber communication networks are fast becoming the desired mechanism for the distribution of telephone signals. Among the advantages of the optical fiber mode of signal transmission are low noise and large bandwidth, as well as a relative immunity to weather conditions such as, for example, moisture. These networks may take any of a number of forms, but have in common the connection, in one manner or another, of a central office (CO) to a subscriber at a distant terminal (DT). Of the various network architectures in use today, a prevalent one is the so-called active star network.

An active star network, a form of which is shown in U.S. Pat. No. 5,329,392 of Cohen, generally comprises a central office from which emanates a large group of fibers. These fibers, in turn, are directed to a plurality of remote terminals (RT). Emanating from each remote terminal is a group of fibers, which are directed to distant terminals (DT). The DT's may be individual subscriber terminals or, as is more likely, curbside terminals which are connected to a plurality of individual residences. Each RT may include a fiber optical terminal system which includes cross-connect switches for performing interconnections between input and output fibers and also outside plant fibers communicating with the remote terminal. It can be appreciated that the numbers of fibers entering and exiting the central office, and between the remote terminals and the distant terminals, are in the several thousands in the usual network, and it is highly desirable that the entire network be mapped to enable, among other things, a repairman in the field to locate the particular fiber or fibers he is to work on and to ascertain the route thereof through the network. Unfortunately, because of the extremely large number of fibers involved, and the large numbers of both RT's and DT's, the map of the network quite often is made obsolete in very a short time. Thus, a lineman may have occasion to move one or more fibers to different available switch terminals within an RT, for example, which has the effect of altering the network without a concomitant change in the existing network map. As a consequence, subsequent work on the network can be misdirected because the network and the map are no longer in conformity. The map, which is usually retained in a computer, must, in order to avoid confusion, mis-connection, false test indications, and other problems arising from the non-conformity, be up-to-date at all times, or at least whenever work on a particular segment of the network is to be performed.

SUMMARY OF THE INVENTION

The present invention is both a method and apparatus for automatically updating the map of an optical fiber transmission system, or at least portions thereof upon which work is to be performed, which is available to a lineman or installer, regardless of his location relative to the network.

In a first illustrative embodiment of the invention, each terminal of the network comprises one or more electro-optic switches of the type, for example, shown in the aforementioned Cohen patent. It is a feature of the apparatus of the invention that each switch has a home position or terminal, and that an optical power meter is connected to the home terminal for detecting and measuring optical power at that terminal. A source of optical energy, which may be an optical time domain reflectometer (OTDR) may be connected to, for example, a switch or switches at one of the terminals, either at the central office or at an RT, or which may be portable, to be carried by the lineman or repairman. The light source is connected to the common armature of the switch, and is adapted to supply light energy to whichever switch terminal the armature is adjacent or optically connected. When the common armature is adjacent the home terminal of the switch and applies optical energy thereto, the power meter will indicate the magnitude of the light energy. Where the amount of light energy applied to the switch arm is known, the power meter reading provides a test of the switch itself, such as the alignment of the armature with the terminal.

With all of the switches in the home position in the next stage or layer of switches of that portion of the network being tested or mapped, the first switch can now be stepped in turn, throughout its array of switch terminals or ports. As a consequence, the light energy applied to the first switch in the cascaded array of switches is applied, in turn, to the home position of each of the switches in the next stage of the cascade. The power meters in each of this second group of switches will, in turn, indicate the presence of light energy on the home terminal or ports. As a consequence, the viability of the optical transmission line from the first switch to each of the switches in the second group is ascertained by the amount of energy measured by each of the power meters. Equally as important, the first stage of mapping has been accomplished. For example, if the second group of switches consists of six switches, numbered in seriatim, it is now known to which of the six switches each of the terminals in the first, or master switch, is connected. Thus, three results have been achieved. The viability of the connecting transmission lines, the viability of each switch as to alignment, for example, and the map of that portion of the network to which the light energy has been applied. The information thus gathered can be applied to a computer or processing unit (CPU) which is adapted to contain the map of the system.

The next or second group of switches, when the armature of each one is at the home position, can now be mapped and tested in the same manner as the first group of switches. Each switch of the first group is stepped, as was the master switch, to each of its terminals in turn, and the switches in the third group which are associated with that particular switch terminal receive the optical or light energy. As a consequence, the map of the network from the second group of switches to the third group is ascertained, as well as the transmission viability of the fibers extending therebetween. The switches of the second group may all be stepped simultaneously or serially, and the information thus obtained is applied to the CPU, which preferably controls the stepping of the switches, for storage. In this manner, the segment of the network upon which work is to be performed is automatically mapped and the computer (or CPU) memory is updated.

The system is such that when the route of a particular fiber is to be traced, light energy applied to that fiber will cause a power meter reading on one switch when all of the switches are in the home position. This switch then becomes the master switch for the subsequent steps of the process. When the master switch is located at the central office, the entire network can be mapped in a relatively brief period of time inasmuch as the switches in each group may be stepped simultaneously. When the master switch is located at one of the remote terminals, for example, only that portion of the network from the RT on will be mapped. Where a completely accurate map of the entire network is desired, it is preferable that the switches be stepped in sequence so that the possibility of the misdirected line will not go undetected. However, as can be appreciated, such a mapping process would be time consuming because of the large numbers of switches involved. If, however, the network is mapped in sections as a preliminary to work being performed thereon, the sectional updates can be inserted into the overall map in the master or central office processing unit. The stepping of the switches as described heretofore can be controlled from the CPU as part of a mapping program. Thus, when the lineman or repair person is in position to launch the optical signal, he can activate the CPU mapping program which then takes over and performs the mapping process.

It is also possible, with the apparatus and method of the invention, to trace a single subscriber's cable route all the way back to the CO if desired, or if necessary, where the individual switches re of the type shown and described in U.S. patent application Ser. No. 08/651,945, filed May 21, 1996. A switch of that type detects light energy coming into any of its ports or terminals, which enables a path tracing from DT to CO.

The method and apparatus of the invention, as described, insures a continuing updating of the network map stored in the computer, such a map insuring the integrity and correctness of the connections throughout the network by revealing any improper connections that may have been made between mappings. The embodiment of the invention discussed hereinbefore is a preferred one because of its simplicity and accuracy, and the principles and features thereof will be more readily understood from the following detailed description read in conjunction with the accompanying drawings.

DETAILED DESCRIPTION

Figure 1:
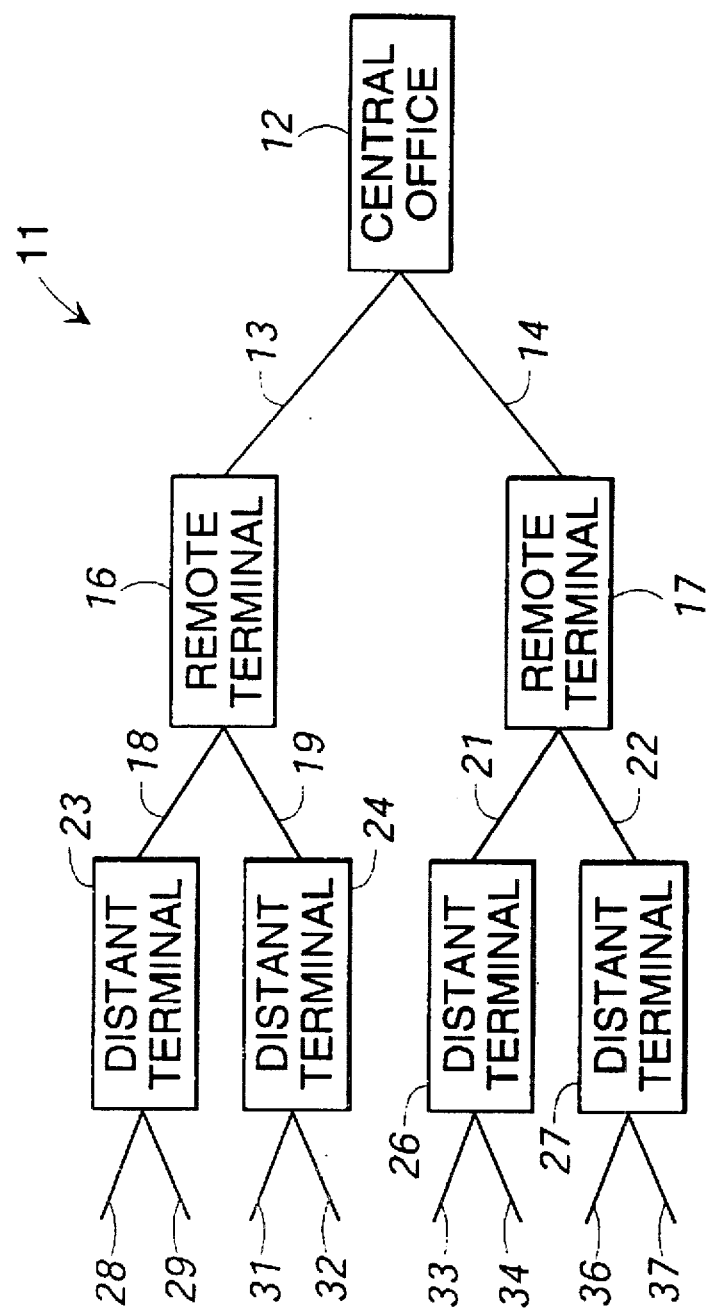
FIG. 1 is a block diagram of an active star network.

The principles and features of the present invention are applicable to number of different network architectures, however, they may be best understood as applied to an active star network, as shown in FIG. 1.

The active star network 11 of FIG. 1, which may, for example, be used to distribute signal transmissions over typical lengths of from one to fifty km, comprises a central office (CO) 12 from which emanate two groups of fibers 13 and 14. It is to be understood that the two groups 13 and 14 are indicative of large numbers of fibers which, for simplicity, are not shown. The fibers 13 and 14 extend to a plurality of remote terminals (RT) only two, 16 and 17, being shown. From each of the remote terminals 16 and 17 emanate even larger groups of fibers 18, 19 and 21, 22, respectively, which extend, as shown, to a plurality of distant terminals (DT) 23, 24, 26, and 27. The DTs may, for example, be located at individual subscriber premises, or they may be situated at curbside enclosures each of which feeds several subscriber stations via lines 28, 29, 31, 32, 33, 34, 36, and 37. Alternatively, there may be another stage of terminals beyond terminals 23, 24, 26, and 27, although this is usually not necessary. Each of the remote terminals RT may include a fiber-optic terminal system (FOTS) for relaying optical fiber transmissions between fibers that carry signals into the FOTS and fibers that carry signals away from the FOTS. Each RT may also include a light guide cross-over switch (LGX) for performing interconnections between the FOTS input and output fibers and also the outside planet fibers which communicate with the RT.

The number of fibers at each of the several locations shown in FIG. 1 may be in the hundreds, or even in the thousands, and it is extremely important that the locations of the fibers throughout the network be known. In other words, it is necessary to have a map of the network to facilitate repair and maintenance operations that are to be performed thereon. Unfortunately, as is often the case, a line person working on the network in the field may use any available switch terminal, for example, to make connections that will afford a resumption of service. Such action can cause a re-routing of some of the fibers involved, so that subsequent workers can be confused by the unknown routing previously performed, with a consequence that service may be partially or wholly interrupted for some lines and, hence, subscribers. Thus it is obvious that the map of the network should be updated at least whenever repair or maintenance work has been completed on any stage thereof. The present invention, as illustrated in FIGS. 2 and 3, furnishes that updating of the network map.

Figure 2:
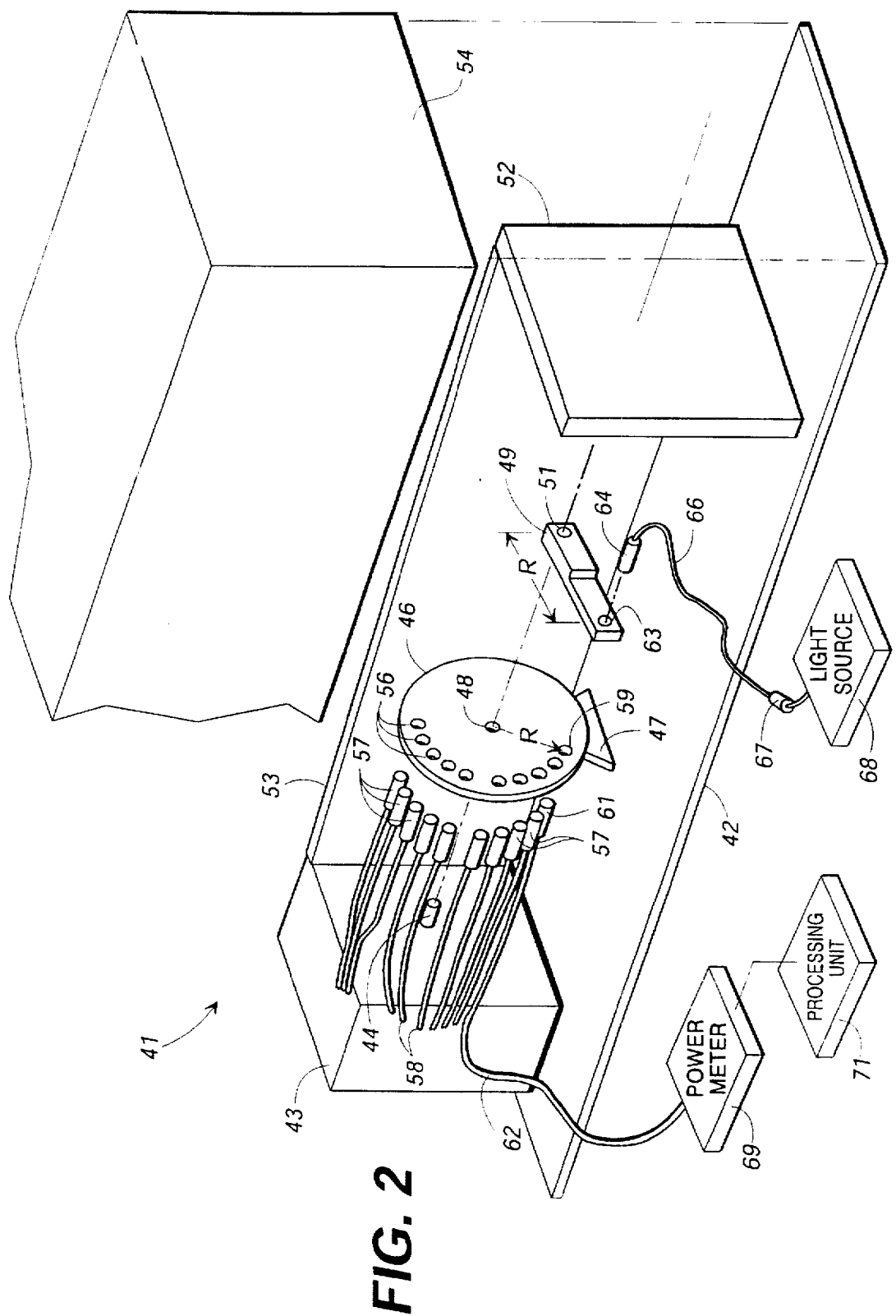
FIG. 2 is an exploded perspective view of an electro-optic switch for use in the present invention.
Figure 3:
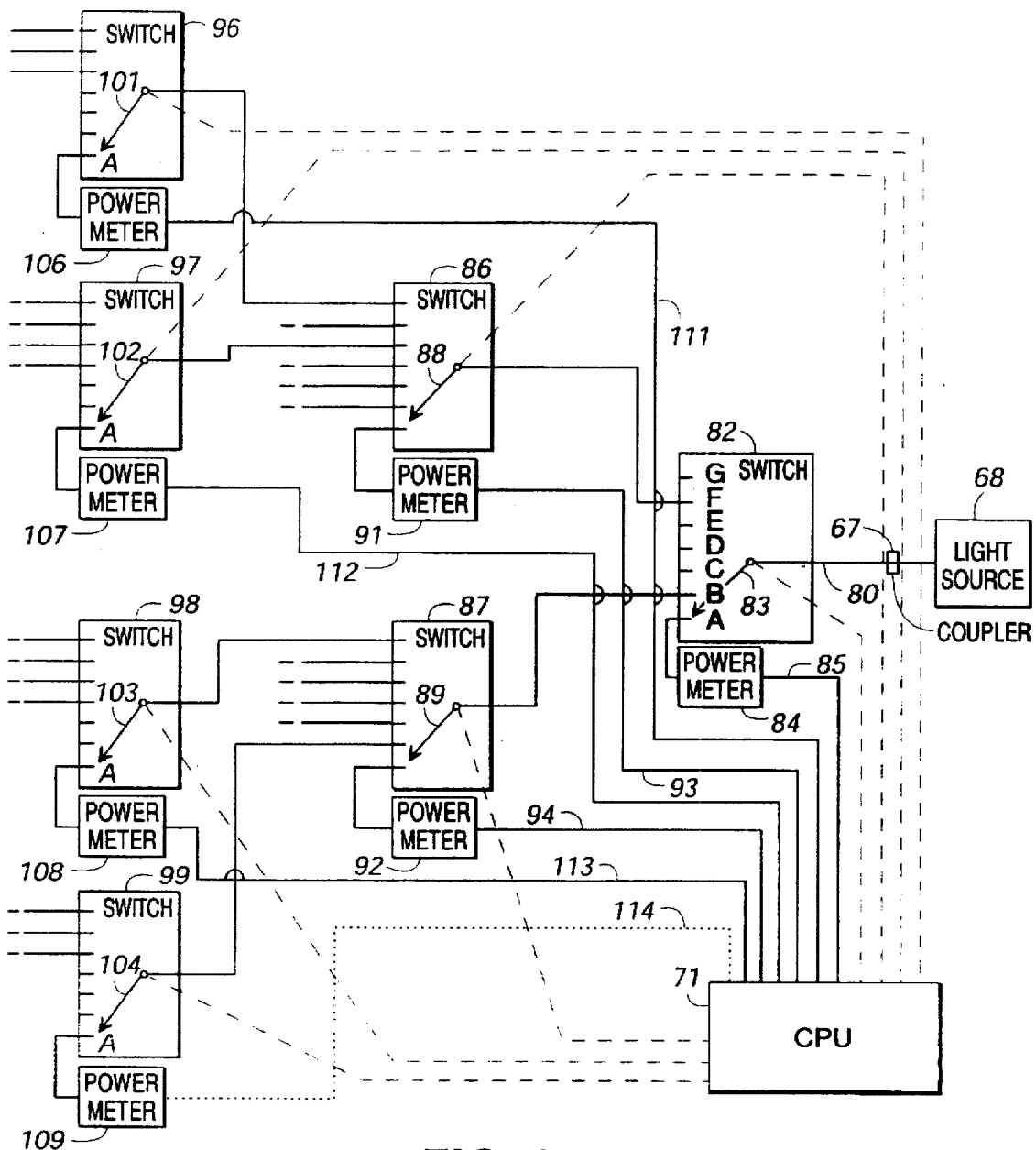
FIG. 3 is a diagrammatic view of a portion of a network, illustrating the principles and features of the present invention.

The present invention includes, in part, a plurality of electro-optic switches as shown in FIG. 2. The switch 41 of FIG. 2 is generally commercially available 1XN electro-optical switch and comprises a base member 42 of, for example, a suitable sheet metal. Mounted on member 42 is an electrical step motor 43 having an axially extending rotatable shaft 44. A support plate 46 is mounted on member 42 and affixed thereto by suitable means 47, which may take any of a number of forms, or plate 46 may be bolted directly or otherwise affixed to member 42. Support plate 46, shown in FIG. 2 as being circular, but amenable to any number of configurations, has a bore 48 which is axially aligned with shaft 44 which extends therethrough. An armature 49 has a bore 51 for receiving shaft 44 in, for example, a press fit, although other means for attaching armature 49 to shaft 44, such as a flat on shaft 44 and a set screw on armature 49, might readily be used. A second support plate 52, axially spaced from support plate 46, is affixed to member 42 by any suitable means. Support plate 52, in conjunction with the housing of motor 43, supports a printed circuit board 53 upon which are mounted various circuit components, not shown, of the switch 41. The entire switch assembly is preferably enclosed by a suitable cover 54 which primarily functions as a protective cover, but which also functions to block extraneous or ambient light from reaching the various components of switch 41.

Support plate 46 has, in the configuration shown in FIG. 2, a semi-circular array of bores 56 within which are affixed a plurality of fiber terminations 57 and the accompanying fibers 58. In addition, the first bore 59 of the array contains a fiber termination 61 and accompanying fiber 62. Bore 59, termination 61, and fiber 62 define a home position for the switch armature 49, whereas bores 56, terminations 57 and fibers 58 are connected directly into the network, as will be discussed more fully hereinafter, by means of directional couplers or other suitable coupling means, not shown. As shown in FIG. 2, switch 41 is a 1×9 switch, there being nine fibers 58 that are coupled into the network, and having one home position. It is to be understood that the number of fibers 58 and fiber terminations 57 mounted in bores 56 may be any number commensurate with the demands of the network and physical space available. Thus, it is possible for switch 41 to have a 1×24 or 1×36 capacity, or some other suitable capacity. The fiber terminations 57 and 61 are preferably of the type known as Grin-rod lenses which have an expanding pattern for capturing light incident thereupon.

Armature 49 has a second bore 63 therein, spaced from bore 51 by a distance R. Each of the bores 56, and 59, in plate 46 is spaced from the center bore 48 the same distance R. Thus, when armature 49 is rotated in steps by stepping motor 43, bore 63 coincides with each of the bores 59 and 56 in turn. Mounted in bore 63 is a Grin-rod lens focusing fiber termination 64, with the lens preferably having a collimating pattern, and an optical fiber 66 connected thereto. Fiber 66 has a coupling device 67 at the other end thereof, and, in accordance with a feature of the present invention, a light source is coupled to fiber 66 through coupler 67, as will be discussed more fully hereinafter, for introducing light into fiber 66, termination 64 and then to individual ones of the fiber terminations 61 and 57. In order that losses be minimized, the face of armature 49 adjacent the front surface of plate 46 is spaced therefrom a small distance such as, for example, 0.03125 inches, which insures free movement of armature 49 relative to plate 46 while minimizing light energy loss.

In accordance with a feature of the invention, fiber 62, the home fiber, is connected to a power meter 69, the output of which is an electrical signal indicating the amount of optical energy incident on termination 61 as transmitted through fiber 62. This output signal is applied to a suitable processing unit 71 which may be located at an RT or at the CO. Thus, when the armature 49 is in the home position with termination 64 directly opposite termination 61, activation of light source 68 will cause meter 69 to generate an electrical signal indicative of the light energy incident on termination 61. Power meter 69 is shown as a separate adjunct to switch 41. However, meter 69 can, in many cases, be incorporated into the circuitry carried by board 53, and hence become or be an integral part of switch 41, or it can be mounted on plate 42 as an integral part of the switch.

In FIG. 3, there is shown a diagram of a portion 81 of a network, such as the star network 11 of FIG. 1. The network portion 81 comprises a first stage having a switch 82 of, for example, the type shown in FIG. 2, shown in FIG. 3 as having an armature 83 and seven terminals A, B, C, D, E, F, and G, of which terminal A is the home terminal. Terminal A is connected to an optical energy power meter 84, the output of which is connected via optical fiber 85 to CPU 71, as shown. Terminals B 20 through G are each connected via optical fibers, only two of which are shown, to the armature of one of a group of switches 86, 87, only two of which are shown. It is to be understood that each of the terminals B through G is connected to a separate switch of the group containing switches 86 and 87, which may be located, for example, at a remote terminal. The armatures 88 and 89 of switches 86 and 87 are both shown in the home position at terminal A, which, in each switch 86 and 87, is connected to optical energy power meters 91 and 92 respectively. The outputs of meters 91 and 92 are connected, via fibers 93 and 94, respectively, to CPU 71, as shown. Each of the several terminals, others than the home terminal A, of switches 86 and 87 is connected to the armature of a switch in a next stage or group of switches, only four, switches 96, 97, 98, and 99, being shown. The respective armatures 101, 102, 103, and 104 of the switches 96, 97, 98, and 99 are shown in the home position at terminal A. Terminal A of each switch is connected to an optical energy power meter 106, 107, 108, and 109 respectively, the outputs of which are connected via fibers 111, 112, 113, and 114 to the CPU 71. The switches 96, 97, 98, and 99, as well as all of the switches in this particular stage may, for example, be located at a DT, and the individual terminals thereof are connected to individual subscriber premises. On the other hand, network portion 81 may be only a small portion of the total network, and there may be additional stages beyond switches 96, 97, 98, and 99. By the same token, switch 82 may be located within the network at a terminal removed from the central office.

CPU 71, which preferably contains a mapping program, as will be apparent hereinafter, controls the positions of the several switch armatures by controlling the individual stepping motors (not shown). The dashed lines leading from CPU 71 to each of the armatures are intended to indicate such control.

OPERATION

In a situation where a lineperson, for example, is called upon to work on a segment 81 of the network 11, ordinarily he has available a map of the segment, either in hand or on an accessible computer. However, as pointed out in the foregoing, the map might be obsolete or inaccurate for any of a number of reasons. Utilizing the following steps, he or she can not only ascertain whether the map is inaccurate, but also can supply the data necessary to make the map up-to-date.

The first step in the process is the selection of a master switch in the vicinity of where the lineperson is to be working. He or she connects an optical energy source 68, which may be an optical time domain reflectometer (OTDR) and as such is part of the monitoring system for the network, or its may be a portable light source carried by the lineperson, through coupler 67 to an optical fiber 80 which, in turn, is connected to the armature 83 of switch 82. At this point, the lineperson does not necessarily know to which switch he or she is connecting, although it is known that fiber 80 goes to a switch. The lineperson then activates the search or mapping program in CPU 71 which can be done from remote areas. The CPU 71 drives all of the switches in this portion 81 of the network to the home position, as shown in FIG. 3. When light source 68 is activated, one of the switches (in this case switch 82) passes the light energy to its associated power meter, such as meter 84. Whichever switch registers, through its associated power meter, light energy incident on its home terminal is the master switch for the portion 81 of the network being mapped. For purposes of this discussion, switch 82 is considered to be the master switch. The amount of energy measured by meter 84 affords an indication of the integrity and viability of the switch 82. Too great a drop in light energy from the known energy of source 68 to meter 84 indicates an improperly functioning switch, or faulty connections thereto. Thus, the connections can be checked, or the switch 82 can be replaced.

Assuming switch 82 is functioning properly, the CPU 71 then steps the armature 83 to port or terminal B, leaving the remaining switches in their home position. The light energy is then passed to whichever switch terminal B is connected to, for example, switch 87, and the associated power meter 92 registers the presence of the energy incident on the home terminal A of that switch. In like manner, as switch 82 is stepped through its array of terminals or portions, the remaining switches of the next stage after the master switch are determined, and the information is forwarded to the CPU 71. As the stepping process is completed for switch 82, each of the switches in the next stage, e.g. switches 86 and 87, is stepped through its array to determine the route of the connections from the ports or terminals of the switches to the next stage of switches, e.g. switches 96, 97, 98, and 99. This process may be accomplished by simultaneously stepping 86 and 87, or they may be stepped in sequence. That is, switch 86 can be stepped through its array of terminals and the switches connected thereto determined before the stepping of switch 87, or switch 86 and 87 and the other switches in the stage may, under control of CPU 71, be stepped simultaneously.

The mapping process is continued for however many stages it is desired to map, and the information applied to CPU 71 updates the map of network portion 81 stored therein. When the portion of the network being mapped includes a subscriber station at or beyond the distant terminal, the final indication of the presence of the optical energy will be made by the subscriber equipment.

It is also possible, in a variation of the procedure discussed in the foregoing, to trace a single route if desired. Thus, when the armature 83 of switch 82 is at terminal B, the armature 89 of switch 87 can be placed at whatever terminal or port is designated, as can the armature 104 of switch 99. Such a procedure provides a check or verification of an existing map which indicates which ports of the several switches are, or should be, connected in series from one location in the network to the other. Additionally, the system of the present invention can be used to map the entire network in a very brief span of time thus materially decreasing the labor and expense concomitant therewith.

The principles and features of the present invention have been illustrated in a preferred embodiment thereof. Various modifications or alterations, or procedures, may occur to workers in the art without departure from the spirit and scope of the invention.

In conclusion of the detailed description, it should be noted that it will be obvious to those skilled in the art that many variations and modifications may be made to the preferred embodiment without substantially departing from the principles of the present invention. All such variations and modifications are intended to be included herein as being within the scope of the invention. Further, in the claims hereafter, the corresponding structure, material, or acts for performing the functions in combination with other elements as specifically set forth in the claims.

I claim:

1. In an optical fiber communication network having one or more switch members therein arrayed in successive stages, wherein each of the switches has an input and a plurality of output ports and means for optically connecting the input to any one of the output ports;
   means for mapping the optical fiber routes from a first stage of the network to one or more succeeding stages, said means for mapping comprising:
   measuring means optically connected to a home position port of each of the switches for measuring optical energy applied to said home port from the input of the switch for producing an output indicative thereof; and
   means for receiving and processing the output of each of said measuring means to produce command signals to each of the switches to cause them to step in sequence to the output ports therein.

2. The means for mapping as claimed in claim 1 and further comprising:
   means for applying optical energy to the input of a first switch in a first stage in the network in its home position to produce an output from said measuring means connected to said home position port.

3. The means for mapping as claimed in claim 2 wherein at least some of the output ports of said first switch are each connected to the input of separate switches in a succeeding stage so that optical energy applied to the input of said first switch can be applied to a second measuring means associated with one of the switches in said succeeding stage when said one switch is in its home position.

4. The means for mapping as claimed in claim 3 wherein there is a plurality of switches in said succeeding stage, the input of each of said plurality of switches being optically connected to a separate output port of said first switch, each of said plurality of switches having a measuring means optically connected to the home port thereof for receiving optical energy applied to the input of said first switch.

5. The means for mapping as claimed in claim 4 wherein at least some of the output ports of each of said plurality of switches in said second stage are each optically connected to the inputs of a second plurality of switches in a third stage, each of said switches in said third stage having a measuring means optically connected to the home port thereof for receiving optical energy applied to the input of said first switch.

6. A method of mapping optical fiber routes in an optical fiber communication network wherein the network has at least two stages of switches, the output ports of a first stage each being connected to the inputs of separate switches in the second stage, each switch having a home port not so connected, comprising the steps of
   applying an optical signal to the input of a switch in the first stage;
   measuring the optical energy appearing at the home port of the switch and generating a signal indicative thereof;
   applying the optical signal to an output port of the switch;
   applying the signal at the output port to the input of a second switch in a second stage; and
   measuring the optical energy appearing at the home port of the second switch and generating a signal indicative thereof.

7. The method of mapping as claimed in claim 6 and further including the steps of
   applying the optical energy received by the switch to an output port thereof;
   applying the signal at the output part of the second switch to the input of a third switch in a third stage; and
   measuring the optical energy appearing at the home port of the third switch and generating a signal indicative thereof.

8. A method of mapping optical fiber routes in an optical fiber communication network wherein the network has at least two stages of switches, each of the switches having an input, a home position port and a plurality of output ports, each of the output ports of each of the switches in each stage being connected to the input of a separate switch in a succeeding stage, comprising the steps of:
   placing each of the switches in a first stage at the home port position;
   applying optical energy to the input of a first switch in the first stage;
   detecting and measuring the optical energy appearing at the home port of the first switch;
   applying the optical energy input to the first switch to each of the output ports thereof in seriation; and determining which of the switches in the second stage has its input connected to which ones of the output ports of the first switch by detecting and measuring the optical energy appearing at the home port of each of the switches in the second stage.

9. The method as claimed in claim 8 wherein the network has a third stage of switches, each of the switches having an input, a home position port, and a plurality of output ports, said method further including the steps of:

determining which of the switches in the third stage has its input connected to which ones of the output ports of the switches in the second stage by applying the optical energy input to each switch in the second stage to each of the output ports thereof in seriation; and detecting and measuring the optical energy appearing at the home port of each of the switches in the third stage.

10. The method as claimed in claim 8 and further including the initial step of placing all of the switches in the network portion being mapped in the home port position.

11. The method as claimed in claim 9 wherein the step of applying the optical energy input to each switch in the second stage to each of the output ports thereof in seriation is performed for the switches in the second stage in sequence.

12. The method as claimed in claim 9 wherein the step of applying the optical energy input of each switch in the second stage is the output ports thereof in seriation is performed for all of the switches in the second stage simultaneously.

* * * * *